No. 647,489. Patented Apr. 17, 1900.
W. P. GLASS.
DRAFT EQUALIZER.
(Application filed Sept. 26, 1899.)
(No Model.) 2 Sheets—Sheet 1.
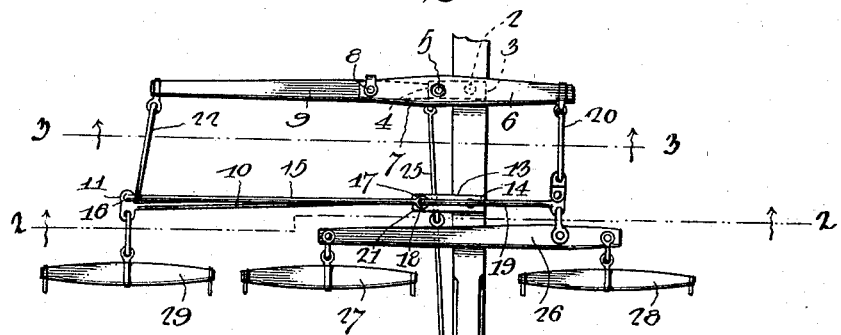
Witnesses William P. Glass, Inventor.
By his Attorneys.

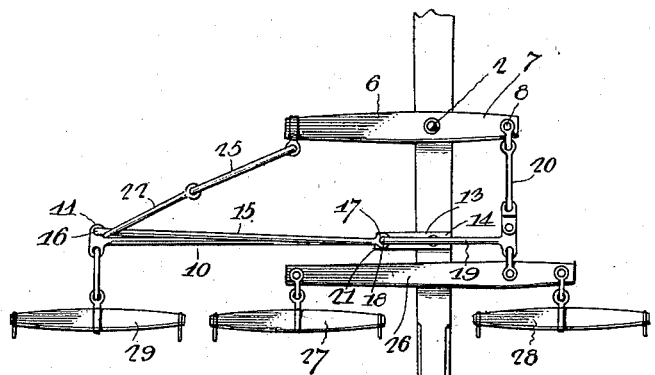
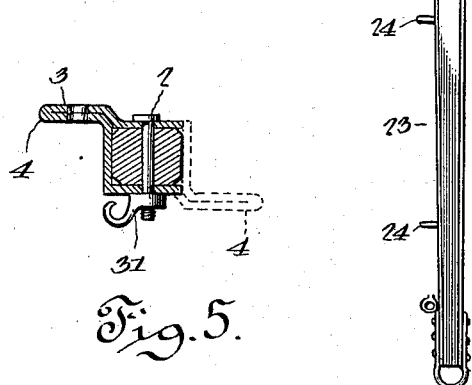
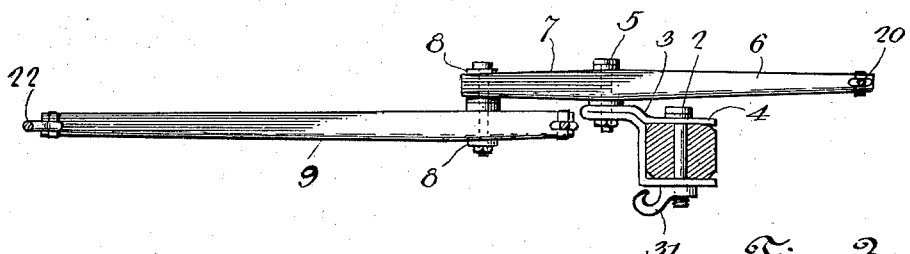

UNITED STATES PATENT OFFICE.

WILLIAM P. GLASS, OF CHAPMAN, KANSAS.

DRAFT-EQUALIZER.

SPECIFICATION forming part of Letters Patent No. 647,489, dated April 17, 1900.

Application filed September 26, 1899. Serial No. 731,760. (No model.)

*To all whom it may concern:*

Be it known that I, WILLIAM P. GLASS, a citizen of the United States, residing at Chapman, in the county of Dickinson and State of Kansas, have invented a new and useful Draft-Equalizer, of which the following is a specification.

My invention relates to a novel draft-equalizer, and has for its object the production of a device of this character capable of equalizing the exertions of a number of draft-animals harnessed to a vehicle at different distances from the direct line of draft and which were it not for my evener or equalizer would exert unequal draft upon opposite sides of the pole, thereby causing the slewing of the front axle, the crowding of the animals, and a loss of a large percentage of the power applied.

To the accomplishment of the general object stated, the invention consists in a novel combination of levers and connecting-rods serving to equalize the draft of, say, for instance, five draft-animals, but capable of ready rearrangement and conversion to accommodate, say, three animals.

Referring to the drawings, Figure 1 is a plan view of my draft-equalizer adapted for five horses. Fig. 2 is a sectional elevation thereof on the line 2 2 of Fig. 1. Fig. 3 is a similar elevation on the line 3 3 of Fig. 1. Fig. 4 is a plan view of the device arranged for three horses. Fig. 5 is a detail sectional view of the pole and the evener-bracket, the reversed position of which latter is indicated in dotted lines. Fig. 6 is a detail perspective view of the swinging bracket, and Fig. 7 is a similar view of the evener-bracket.

Referring to the numerals of reference indicating corresponding parts in the several views, 1 indicates a tongue of a vehicle, adjacent to the rear end of which is secured by a bolt 2, what may be termed an "evener-bracket" 3, preferably comprising, as illustrated, a substantially U-shaped portion straddling the tongue and a bearing-arm 4, projecting from one corner of the bracket and disposed slightly above and to one side of the tongue. Pivotally mounted upon this bearing-arm 4, by a swivel bolt or pintle 5, is the primary evener or equalizing-lever 6, the short end 7 of which, extending beyond the arm 4, pivotally supports, as by a pintle 8, the secondary evener or equalizing-lever 9, designed to equalize the efforts of a number of draft-animals, the resultant efforts of which are opposed to the efforts of other animals exerting a pull upon the opposite end of the primary evener, which latter, in accordance with well-known principles, serves to equalize the efforts of the animals, which, by reason of the arrangement stated, exert opposed drafts upon its opposite ends.

Now it is obvious that in order to prevent crowding of the draft-animals some provision must be made for properly spacing them with respect to the tongue and to each other and for eliminating unequal side draft, which would interfere with their efforts. Therefore I have found that the provision of a swinging arm extending laterally from the tongue and linked to the outer end of the secondary evener will serve as a connection for the singletree for the "third horse," so called, and will give such direction to the draft exerted thereby as will prevent the crowding of the adjacent pole-horse.

The swinging arm referred to is indicated by the numeral 10, and it may be of any desired construction. I prefer to employ, however, a stiff metal rod provided at one end with an eyelet 11, passed adjacent to its opposite end through the hanger 12 of a substantially L-shaped swinging bracket 13 and having its extremity bent at an angle and passed through the tongue from the under side and through the horizontal extremity 14 of the bracket. The rod or swinging arm 10 is further braced and supported by a brace 15, having an angular extremity 16 passed through the eyelet 11 and having its opposite extremity provided with an eyelet 17 for the reception of the angular end 18 of an oppositely-disposed swinging arm 19, connected at its outer end through a flexible connecting member 20 with the end of the primary equalizer or evener 6, opposite the connection of the latter with the secondary evener 9. The angular end 17 of the swinging arm 19 has a vertical bearing in the horizontal extension 21 of the swinging bracket 13.

22 indicates a link or connecting member having a flexible connection at its opposite extremities with the outer ends of the swinging arm 10 and evener 9, respectively.

23 indicates what I will term the "tongue-rod" extending along the tongue, preferably in guides 24, secured thereto and linked by a short link 25 to the short end of the secondary evener 9.

26 indicates a doubletree connected by a clevis or the like to the outer end of the swinging arm 19 and carrying singletrees 27 and 28 at opposite sides of the tongue for the pole-horses.

29 indicates a singletree connected to the outer end of the swinging arm 10 to accommodate a third horse located abreast with the pole-horses, and 30 indicates a doubletree connected at the outer extremity of the tongue-rod 23 in advance of the three horses just referred to and designed for the connection of the lead team.

It has been stated that my device is readily convertible for the accommodation of three horses, for instance; but before proceeding to a description of this conversion or rearrangement I will note briefly the operation of the five-horse evener or equalizer just described.

It will be noted that the draft exerted by the pole-horses is communicated directly to the long end of the primary evener and is opposed by the draft of three horses—that is to say, the lead team and the third horse connected through the mechanism described to the opposite or short end of the primary evener. Thus the latter serves to equalize the efforts of the pole-horses considered as one factor and the third and lead horses as the other. In like manner the efforts of the lead horses and the third horse are equalized by their connection, respectively, with the short and long arms of the secondary evener 9, and the crowding of the draft-animals by the side draft is prevented by the connection of the single and double tree to the laterally-swinging arms 10 and 19, linked to the outer ends of the primary and secondary eveners.

If now it is desired to convert the device into a three-horse evener, the parts may be readily rearranged, as follows: The eveners are disconnected and the secondary evener is entirely removed. The bolt 2 of the evener-bracket is withdrawn and the bracket is reversed to bring the arm 4 below the tongue. The evener 6 is now reversed to bring its long arm on the side of the tongue adjacent to the third horse and is pivoted directly at the center of the tongue by the reinsertion of the bolt 2. The short link 25, which in the other adaptation of the invention connected the tongue-rod with the secondary evener, is now removed from the rod and is connected to the rear extremity of the link 22 and to the adjacent extremity of the evener. Theoretically the operation of this form or arrangement of the apparatus is identical with that described in connection with the five-horse form, inasmuch as the identity of the device is retained, with the exception of the elimination of the secondary equalization necessary when an odd number of horses are connected to one end of the primary equalizer.

When the tongue-rod is not in use, it is drawn back under the tongue and its terminal eyelet employed for the connection of the link 25 is engaged by the hook-nut 31, employed to retain the bolt 2.

From the foregoing it will be observed that I have produced a simple, convenient, and effective draft-equalizing device capable of ready conversion to accommodate different numbers of draft-animals and constructed and arranged in a manner to equalize their efforts without crowding or side draft; but while the embodiment of my invention herein illustrated and described is believed at this time to be preferable I reserve the right to effect such changes, modifications, and variations as may come within the scope of the protection prayed.

What I claim is—

1. In a draft-equalizer, a support, a primary evener mounted upon the support, oppositely-extending swinging arms, one of the latter having its inner extremity pivoted to the support, and the other arm extending transversely at opposite sides of the support, and having a pivotal connection at a point intermediate of the ends of the former arm, operative connections between the outer free ends of the arms, and the respective ends of the evener, and draft devices provided at the outer free ends of the arms, substantially in the manner shown and described.

2. In a draft-equalizer, a support, a primary evener mounted upon the support, a swinging bracket carried by the latter and located in advance of the primary evener, oppositely-extending swinging arms connected to the swinging bracket and movable therewith, operative connections between the primary evener and the respective arms, and draft devices also connected to said swinging arms, substantially in the manner shown and described.

3. In a draft-equalizer, the combination with a support, of a primary evener mounted upon the support, a swinging and substantially L-shaped bracket also mounted on the support, a swinging arm connected to the bracket, and having an angled inner end passing loosely through the support and bracket, and pivotally mounting the latter and the arm, an oppositely-extending swinging arm, having an angled inner end pivoted upon the swinging bracket, a brace pivoted to the angled end of the latter arm and also connected to the outer free end of the former arm, operative connections between the free ends of the arms and the respective ends of the primary evener, and draft devices applied to the respective swinging arms, substantially in the manner shown and described.

4. A draft-equalizer comprising a support, a primary evener, a secondary evener pivotally carried at one end of the primary evener, a pair of swinging arms extending oppositely and operatively connected with the outer extremities of said eveners, draft devices connected to said swinging arms, and a draft device connected to the inner end of the secondary evener.

5. A draft-equalizer comprising a support, a primary equalizer, a secondary equalizer carried thereby, a swinging bracket carried by the support, a pair of laterally-extending swinging arms connected to the bracket and operatively related to the outer ends of the primary and secondary eveners, a tongue-rod extending along the tongue and connected to the inner end of the secondary evener, and draft devices connected to the swinging arms and tongue-rod respectively.

6. A draft-equalizer comprising a tongue, primary and secondary eveners, a swinging arm having an angular extremity passed through the tongue, a swinging bracket retained by said arm, a second oppositely-disposed swinging arm having a bearing in said bracket, a brace extending from the bracket to the outer end of the first-named arm, connecting members intermediate of the swinging arms and the outer ends of the eveners, a tongue-rod connected to the inner end of the secondary evener and movable in guides carried by the tongue, and draft devices connected to the swinging arms and tongue-rod respectively.

7. In a draft-equalizer, a support, a primary evener mounted thereon, a swinging bracket carried by the support and located in advance of the primary evener, a swinging arm having its inner end pivoted to the support, and also connected to the bracket and movable therewith, a second swinging arm extending transversely at opposite sides of the support, and having its inner end pivoted to the bracket and movable therewith, operative connections between the primary evener and the swinging arms, and draft devices also connected to said arms, substantially in the manner shown and described.

8. In a draft-equalizer, a support, a primary evener mounted thereon, a secondary evener connected to the shorter end of the primary evener, draft devices connected to opposite ends of the secondary evener, a whiffletree connected at one side of its center to the opposite longer end of the primary evener, and draft devices located at opposite ends of the whiffletree, the longer portion of the latter extending toward the secondary evener, substantially in the manner shown and described.

In testimony that I claim the foregoing as my own I have hereto affixed my signature in the presence of two witnesses.

WILLIAM P. GLASS.

Witnesses:
  J. W. MARTIN,
  E. J. BARRETT.